United States Patent
Wang et al.

(10) Patent No.: US 9,350,206 B2
(45) Date of Patent: May 24, 2016

(54) AXIAL GAP ROTATING ELECTRICAL MACHINE

(71) Applicant: Hitachi Industrial Equipment Systems Co., Ltd., Chiyoda-ku, Tokyo (JP)

(72) Inventors: Zhuonan Wang, Tokyo (JP); Yuji Enomoto, Tokyo (JP); Kenichi Soma, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 373 days.

(21) Appl. No.: 13/962,546

(22) Filed: Aug. 8, 2013

(65) Prior Publication Data

US 2014/0042859 A1    Feb. 13, 2014

(30) Foreign Application Priority Data

Aug. 9, 2012    (JP) .................................. 2012-176866

(51) Int. Cl.
*H02K 21/12*    (2006.01)
*H02K 1/27*    (2006.01)
(Continued)

(52) U.S. Cl.
CPC ................ *H02K 1/2793* (2013.01); *H02K 1/28* (2013.01); *H02K 5/15* (2013.01); *H02K 5/1732* (2013.01); *H02K 16/02* (2013.01); *H02K 21/24* (2013.01); *H02K 15/02* (2013.01); *H02K 2201/03* (2013.01); *H02K 2213/03* (2013.01)

(58) Field of Classification Search
CPC ....... H02K 1/2793; H02K 21/24; H02K 1/28; H02K 5/1732
USPC ............ 310/156.32, 156.37, 89–90, 114, 266
See application file for complete search history.

(56) References Cited

U.S. PATENT DOCUMENTS 4,556,809 A * 12/1985 Beisse .................... H02K 57/00
                                                    310/114
6,720,688 B1    4/2004 Schiller
(Continued)

FOREIGN PATENT DOCUMENTS

CN    201877941 U    6/2011
CN    201947136 U    8/2011
(Continued)

OTHER PUBLICATIONS

Chinese Office Action issued in counterpart Chinese Application No. 201310346551.9, dated Jul. 3, 2015, (Eight (8) pages).
(Continued)

*Primary Examiner* — Thanh Lam
(74) *Attorney, Agent, or Firm* — Crowell & Moring LLP

(57) ABSTRACT

An axial-gap rotating electrical machine in which the distance of the air gap between a rotor and a stator can be accurately controlled is provided. A large diameter portion and a small diameter portion are formed on a rotating shaft and a stepped portion is formed therebetween. A rotor yoke is secured thereon and the position of the rotor is determined. The position of a bearing secured in a housing for rotatably supporting the rotating shaft is determined by a boss portion of the rotor yoke. The position of the housing is determined by the position of the bearing and the securing position of the stator is determined by a stepped portion formed on the inner circumference of the housing. Thus the position of the housing relative to the rotating shaft can be determined from the position of the rotor and the securing position of the stator can be determined.

13 Claims, 8 Drawing Sheets

(51) Int. Cl.
*H02K 21/24* (2006.01)
*H02K 1/28* (2006.01)
*H02K 5/173* (2006.01)
*H02K 5/15* (2006.01)
*H02K 16/02* (2006.01)
*H02K 15/02* (2006.01)

(56) References Cited

U.S. PATENT DOCUMENTS

| | | | |
|---|---|---|---|
| 8,786,155 B2* | 7/2014 | Wang | H02K 1/182 |
| | | | 310/156.32 |
| 2010/0072850 A1* | 3/2010 | Miyata | H02K 21/24 |
| | | | 310/156.12 |
| 2011/0148224 A1 | 6/2011 | Tokoi et al. | |
| 2012/0049685 A1 | 3/2012 | Wang et al. | |
| 2012/0187787 A1 | 7/2012 | Saito | |

FOREIGN PATENT DOCUMENTS

| | | |
|---|---|---|
| CN | 102386739 A | 3/2012 |
| JP | 11-206077 A | 7/1999 |
| JP | 2002-537749 A | 11/2002 |
| JP | 2005-261022 A | 9/2005 |
| JP | 2006-025573 A | 1/2006 |
| JP | 2007-104820 A | 4/2007 |
| JP | 2007-228790 A | 9/2007 |
| JP | 2009-33946 A | 2/2009 |

OTHER PUBLICATIONS

Japanese-language Office Action issued in counterpart Japanese Application No. 2012-176866 dated Dec. 1, 2015 with English translation (Six (6) pages).
Extended European Search Report issued in counterpart European Application No. 13179453.9 dated Feb. 4, 2016 (ten (10) pages).

* cited by examiner

AXIAL GAP ROTATING ELECTRICAL MACHINE

CLAIM OF PRIORITY

The present application claims priority from Japanese Patent applications serial No. 2012-176866, filed on Aug. 9, 2012, the respective contents of which are hereby incorporated by reference into this application.

FIELD OF THE INVENTION

The present invention relates to axial gap rotating electrical machines and in particular to an axial gap rotating electrical machine in which a stator and a rotor are placed in the direction of a rotating shaft with an air gap in-between.

BACKGROUND OF THE INVENTION

Rotating electrical machines such as motors and generators are used in many industrial fields. Especially, axial gap rotating electrical machines are flat in shape and are capable of delivering large torque; therefore, it is expected that they will be applied to motors used in hybrid automobiles and motors of the outdoor units of air conditioners.

For example, JP-A-2007-228790 (Patent Document 1) discloses a two-rotor/one-stator axial gap rotating electrical machine. This rotating electrical machine is formed by providing a stator having multiple magnetic poles, obtained by combining a core and a coil, around a rotating shaft; and placing a rotor having multiple permanent magnets on both sides of the stator with a predetermined air gap in the direction of the rotating shaft.

In this type of axial gap rotating electrical machine, it is important for the enhancement of efficiency to accurately control the distance of the air gap between the rotor and the stator.

For example, if the distance of the air gap between a rotor and a stator is larger than desired, the attractive force and repellent force between the stator and the rotor can become smaller than desired. This leads to the degraded performance of the rotating electrical machine. For this reason, it used to be required to maintain the high dimensional accuracy of the air gap when a rotating electrical machine is assembled.

In general, axial gap rotating electrical machines are so structured that parts comprising the axial gap rotating electrical machine are stacked along the direction of the axis of its rotating shaft. Therefore, the dimension errors of each component are accumulated and it used to be difficult to ensure an accurate air gap.

It is an object of the invention to provide an axial gap rotating electrical machine in which it is possible to accurately control the distance of the air gap between a rotor and a stator.

SUMMARY OF THE INVENTION

The invention is characterized in that: a large diameter portion and a small diameter portion are formed in a rotating shaft; a stepped portion is formed therebetween to secure a rotor yoke and the position of a rotor is thereby determined; the position of a bearing for rotatably supporting the rotating shaft, secured in a housing, is determined by this secured portion of the rotor yoke; and the position of the housing is determined by the position of the bearing and the position where a stator should be secured is thereby determined by a stepped portion formed in the inner circumference of the housing.

According to the invention, it is possible to determine the position of the housing relative to the rotating shaft from the position of the rotor and determine the securing position of the stator in this state. This makes it possible to accurately obtain the distance of the air gap between the stator and the rotor.

DETAILED DESCRIPTION OF THE PREFERRED EMBODIMENTS

Hereafter, a detailed description will be given to embodiments of the invention with reference to the drawings. The invention is not limited to the following embodiments and the scope of the invention embraces various modifications and applications within the technological concept of the invention.

First Embodiment

Figure 1:
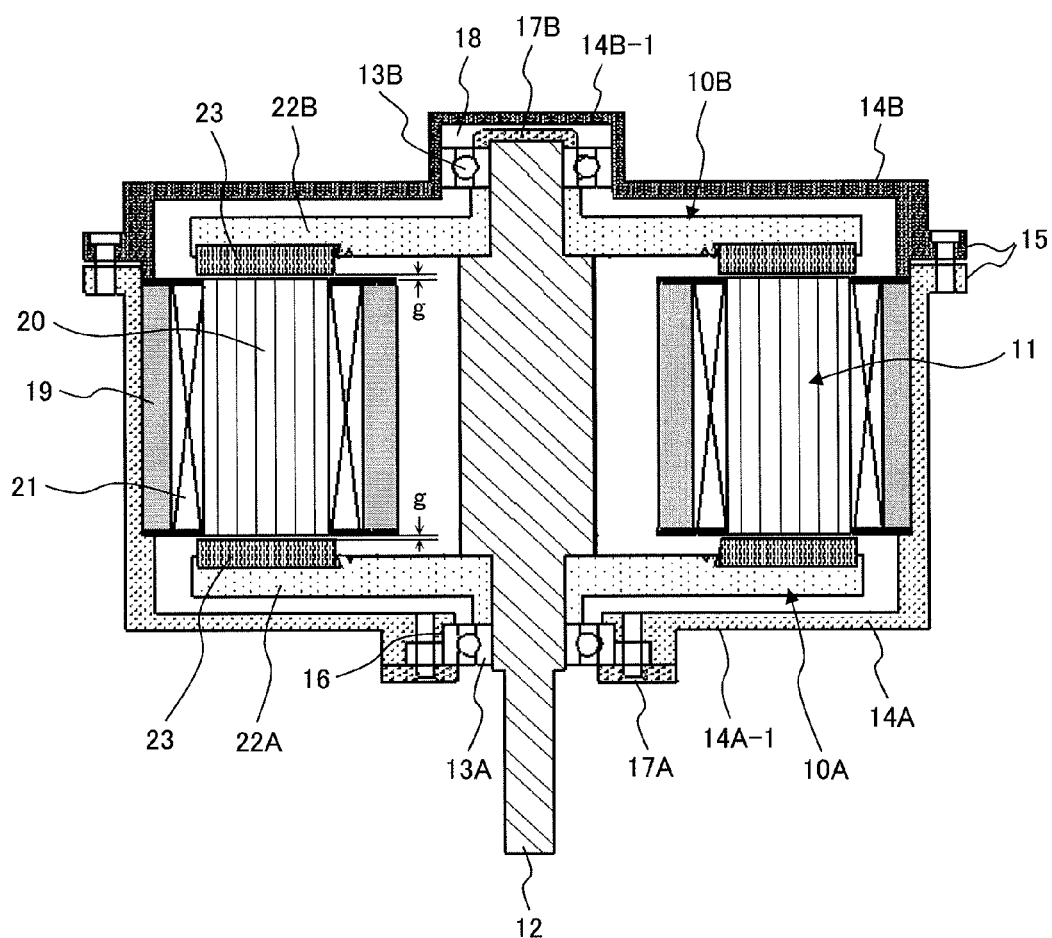
FIG. 1 is a longitudinal sectional view of an axial gap rotating electrical machine in an embodiment of the invention.

FIG. 1 shows a longitudinal section of an axial gap rotating electrical machine illustrating a first embodiment of the invention. The description of this embodiment relates to the configuration of a two-rotor/one-stator axial gap rotating electrical machine. The invention can also been applied to one-rotor/one-stator and one-rotor/two-stator axial gap rotating electrical machines.

The axial gap rotating electrical machine in FIG. 1 is comprised of: two disk-like rotors 10A, 10B; a stator 11 placed between the rotors 10A, 10B and opposed thereto with a predetermined air gap in-between; a rotating shaft 12 securing each rotor 10A, 10B and rotatably supporting them; and a first housing 14A and a second housing 14B rotatably holding both ends of the rotating shaft 12 by bearings 13A, 13B.

The first housing 14A is in the shape of a closed-end cylinder (the shape of a cup) and the stator 11 is secured therein. The second housing 14B is so configured as to cover an opening of the first housing 14A and they are secured together with bolts at the portion of a bracket 15.

Therefore, the rotating shaft 12 is rotatably supported by the bearing 13A provided at the bottom portion 14A-1 of the first housing 14A and the bearing 13B provided at the center portion 14B-1 of the second housing 14B.

The inner ring of the bearing 13A provided at the bottom portion of the first housing 14A is secured on the rotating shaft 12; and the outer ring thereof is secured in a bearing housing portion 16 formed in the bottom portion 14A-1 of the first housing 14A. The outer ring is integrated with the first housing 14A by a bearing retainer 17A provided at the bottom portion 14A-1 of the first housing 14A.

The inner ring of the bearing 13B provided at the center portion 14B-1 of the second housing 14B is secured on the rotating shaft 12; and the outer ring thereof is secured in a bearing housing portion 18 formed in the center portion 14B-1 of the second housing 14B. Position adjustment of the rotating shaft 12 can be facilitated by making the rotating shaft 12 movable relative to the inner ring of the bearing 13B on the second housing 14B side or making the outer ring movable relative to the bearing housing portion 18. In this embodiment, the bearing 13B is secured with a bearing retainer 17B.

The stator 11 has the outer circumference thereof secured on the first housing 14A with synthetic resin 19 having adhesive properties. The inner circumference of the stator 11 is opposed to the rotating shaft 12 with a predetermined gap in-between.

The stator 11 is comprised of a core 20 and a winding 21 and the winding 21 is wound around the core 20 with an insulating material in-between.

The rotors 10A, 10B are each comprised of a rotor yoke 22A, 22B and a flat ring magnet or several segment magnets 23 circumferentially placed on the surface of each of the rotor yokes 22A, 22B. Each ring magnet 23 is placed in opposition to a core 20 with a predetermined air gap g in-between.

In the axial gap rotating electrical machine, as seen from the drawing, the rotors 10A, 10B and the stator 11 are placed in parallel in the direction of the axis of the rotating shaft 12. In the drawing, the rotor 10A, air gap g, stator 11, air gap g, and rotor 10B are placed from bottom in this order along the direction of the axis.

The core 20 of the stator 11 can be formed of a laminated or a wound core made from electromagnetic steel plates or amorphous foil bands, or a soft magnetic powder core. The winding 22 can be formed of a copper wire or an aluminum wire and the ring magnet 12 can be formed of a ferrite magnet, a neodymium magnet, or the like.

Hereafter, a description will be given to the configuration of each part of an axial gap rotating electrical machine comprised of these members.

FIG. 2 to FIG. 5 representatively illustrate the configuration of the rotor 10A. The rotor 10B is of substantially the same configuration and the description thereof will be omitted.

The rotor 10A is comprised of an annular rotor yoke 22A and a ring magnet 23 placed over the surface of the annular rotor yoke 22A. The ring magnet 23 is comprised of multiple magnetic pole pieces and the number of magnetic poles is determined by these magnetic pole pieces.

Figure 2:
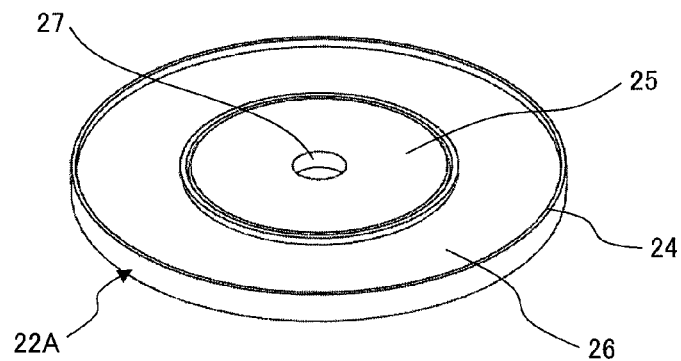
FIG. 2 is an appearance perspective view of a rotor yoke illustrated in FIG. 1.

FIG. 2 illustrates the configuration of the rotor yoke 22A. The rotor yoke 22A has a function of holding the ring magnet 23. The rotor yoke 22A is annularly formed and it is formed of a magnetic material, such as iron or magnetic stainless steel, to effectively transfer magnetic force. An outer circumferential wall portion 24 erected in the axial direction is formed on the outer circumference side of the rotor yoke 22A; and an inner circumferential wall portion 25 also erected in the axial direction is formed on the inner circumference side thereof. An annular groove portion 26 for housing the ring magnet 23 is formed therebetween. The inner circumferential wall portion 25 is provided in the center thereof with a securing hole 27 secured on the rotating shaft 12.

Due to the changing flux from stator slot opening and space harmonics generated by the stator winding, eddy current loss is produced in the rotor yoke 22A. To reduce eddy current loss, it is desired to use a laminated core, such as an electromagnetic steel plate wound core or an amorphous wound core, for the rotor yoke 22A.

Figure 3:
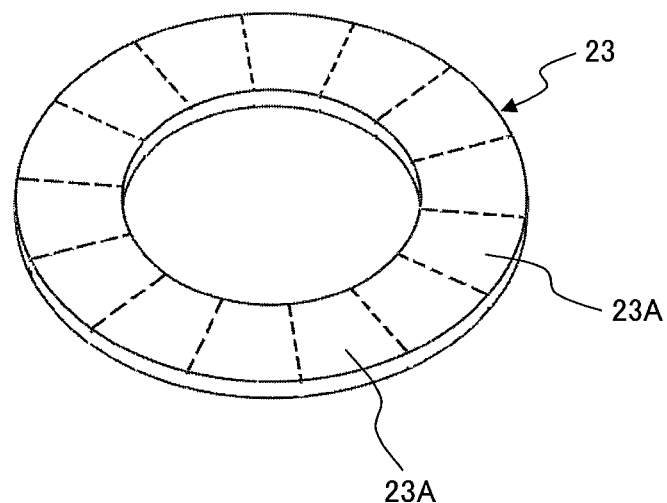
FIG. 3 is an appearance perspective view of a ring magnet illustrated in FIG. 1.

FIG. 3 illustrates the configuration of the ring magnet 23. The reason why the ring magnet 23 is used is to cope with centrifugal force arising from the rotation of the rotor 10A.

In the ring magnet 23, a desired magnetic pole shape is magnetized. As an example of the magnetic pole shape, a required number of magnetic pole pieces 23A are radially formed so that each magnetic pole piece is in a fan shape. However, any other shape is also acceptable. With respect to the type of the magnet, a ferrite magnet, a sintered neodymium magnet, or the like can be used; however, any other appropriate magnet may be used.

Figure 4:
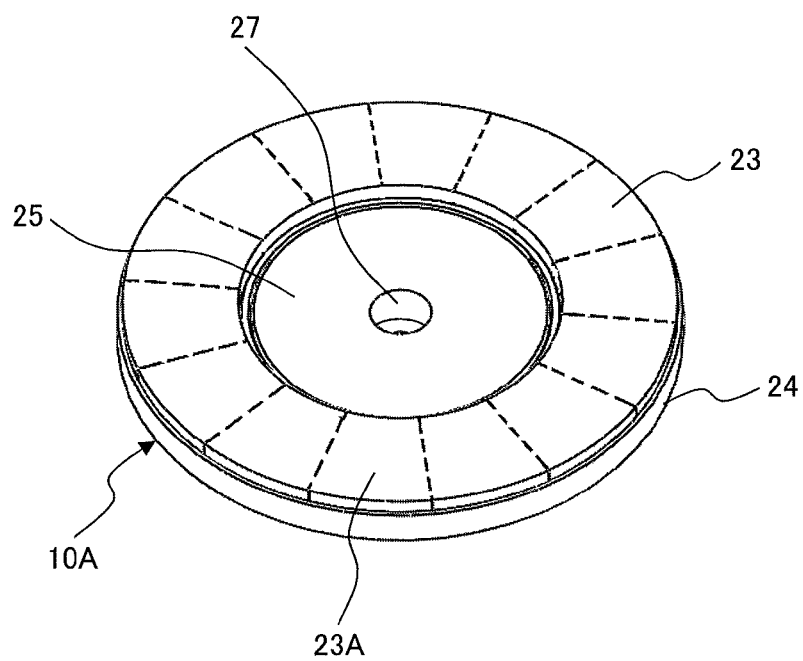
FIG. 4 is an appearance perspective view of a rotor illustrated in FIG. 1.
Figure 5:
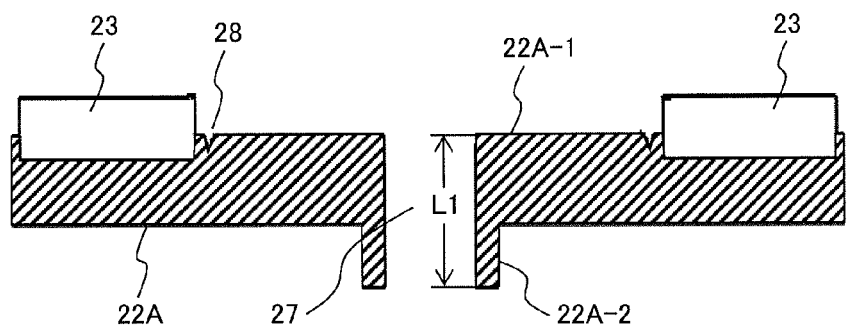
FIG. 5 is a sectional view showing a section of the rotor illustrated in FIG. 2.

When the thus configured ring magnet 23 is housed in the annular groove portion 26 in the rotor yoke 22A, the rotor 10A illustrated in FIG. 4 and FIG. 5 is completed.

The depth of the annular groove portion 26 is ⅓ of the thickness of the ring magnet 23 or below for preventing the ring magnet 23 from coming off in the radial direction. The reason for this is that the depth of ⅓ or above is undesirable in terms of the rigidity of the rotor yoke 22A and the like.

As illustrated in FIG. 4 and FIG. 5, the following measure is taken to secure the ring magnet 23 in the annular groove portion 26 in the rotor yoke 22A: a dam portion 28 having V-shaped sections is circumferentially formed by swaging in the inner circumferential wall portion 25 in proximity to the inner circumferential portion of the ring magnet 23 of the rotor yoke 22A.

The dam portion 28 by swaging is formed as follows: the ring magnet 23 is placed in the groove portion 26 and then an annular V-shaped punch having a diameter smaller than the inside diameter of the ring magnet 23 is applied to the inner circumferential wall portion 25; and the inner circumferential wall portion 25 of the rotor yoke 22A is thereby brought to the inner circumference side of the ring magnet 23 to secure together the ring magnet 23 and the rotor yoke 22A. A similar dam portion may also be formed on the outer circumference side of the rotor yoke 22A.

The rotor yoke 22A includes a flat portion 22A-1 holding the ring magnet 23 and a one-sided boss portion 22A-2 forming the securing hole 27. In this embodiment, the length L1 from the surface of the flat portion 22A-1 to the tip portion of the one-sided boss portion 22A-2 is accurately controlled. The length L1 serves an important function for accurately assembling the air gap g between the rotor 10A (and 10B) and the stator 11, which will be described later.

Figure 6:
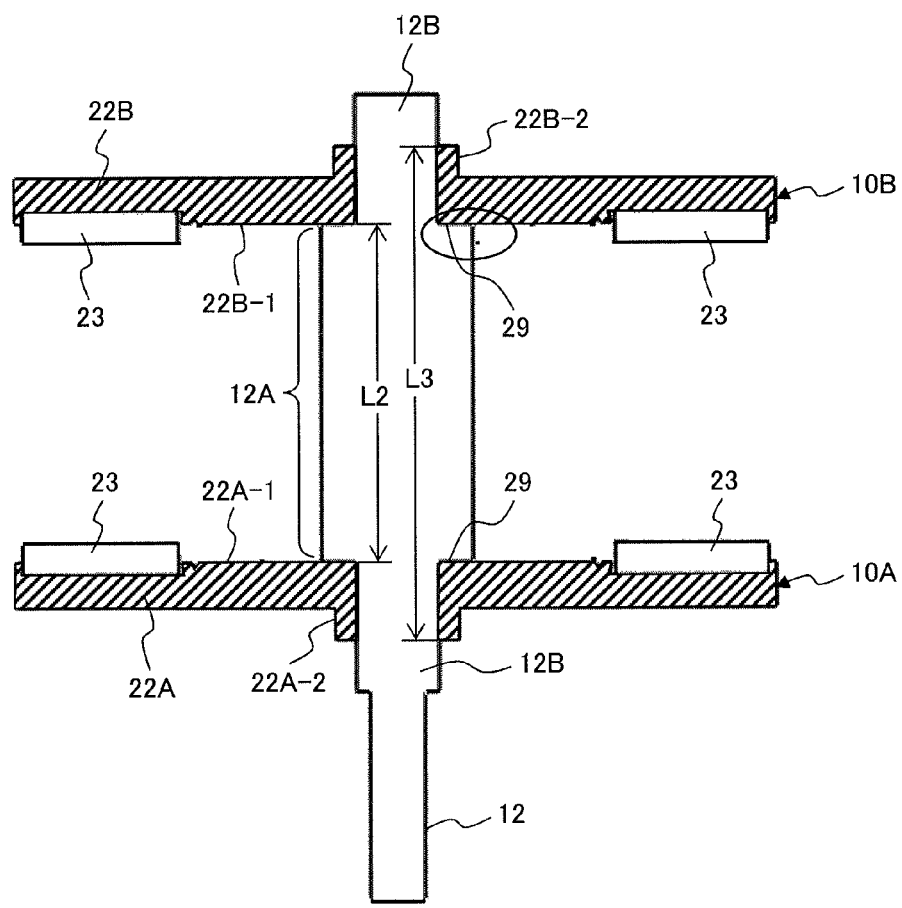
FIG. 6 is a longitudinal sectional view obtained when the rotors and rotating shaft illustrated in FIG. 1 are mated together, in which a stator that should be placed between the rotors is omitted.

FIG. 6 illustrates the configuration obtained when the rotors 10A, 10B and the rotating shaft 12 are combined and secured together. When the two rotors are combined, in reality, the stator 11 is positioned therebetween; however, the depiction of the stator 11 is omitted for the sake of explanation.

A large diameter portion 12A is formed in the vicinity of the center of the rotating shaft 12 and a small diameter portion 12B is formed on both sides of the large diameter portion 12A with a stepped portion 29 in-between. The large diameter portion 12A is opposed to the inner circumferential portion of the stator 11 and the small diameter portions 12B are portions where the rotor yokes 22A, 22B are secured. The rotor yokes 22A, 22B are configured so that they are secured in tight contact with the stepped portions 29.

The length L2 of the large diameter portion 12A between the small diameter portions 12B also serves an important function for accurately assembling the air gap g between the rotors 10 and the stator 11. That is, the length L2 of the large diameter portion 12A of the rotating shaft 12 is accurately controlled; as a result, the length (L2) between the flat portions 22A-1, 22B-1 of the respective rotor yokes 22A, 22B of the two rotors 10A, 10B is also accurately controlled.

As mentioned above, the length L2 of the large diameter portion 12A and the length L1 from the tip of the one-sided boss portion 22A-2 from the flat portion 22A-1 of the rotor yoke 22A are accurately controlled. As a result, the length L3 to the tip of the one-sided boss portion 22A-2, 22B-2 of the rotor yoke 22A, 22B is also accurately controlled.

The rotors 10 and the stator 11 pull each other hard by the magnetic attractive force produced therebetween. However, since the rotor yokes 22A, 22B are secured on the small diameter portions 12B in tight contact with the stepped portions 29, the following takes place: the movement of the rotor yokes 22A, 22B is arrested by the stepped portions 29 formed between the small diameter portions 12B and the large diameter portion 12A. This makes it possible to prevent the axial displacement of the rotors 10A, 10B and accurately control the air gaps g.

Figure 7:
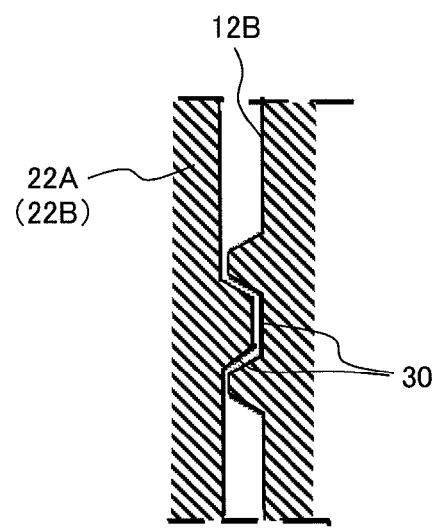
FIG. 7 is a sectional view showing a section of the secured area between the rotor illustrated in FIG. 4 and the rotating shaft.

As illustrated in FIG. 7, the following are secured together by knurled portions 30: the one-sided boss portion 22A-2, 22B-2 formed in the rotor yokes 22A, 22B which boss portions function as securing portions forming the securing holes 27 and the small diameter portions 12B of the rotating shaft 12. These knurled portions 30 are utilized to align the magnetic poles of the rotors 10A, 10B or for alignment in the circumferential direction. The knurled portions 30 make it possible to align the rotors 10A, 10B without increasing the number of parts. In case of a small-capacity rotating electrical machine, the number of the knurled portions 30 may be small and they may be shallow. Meanwhile, in case of a large-capacity rotating electrical machine, it is required to provide a large number of deep knurled portions 30.

A description will be given to the configurations of the first housing 14A, second housing 14B, and stator 11.

Figure 8:
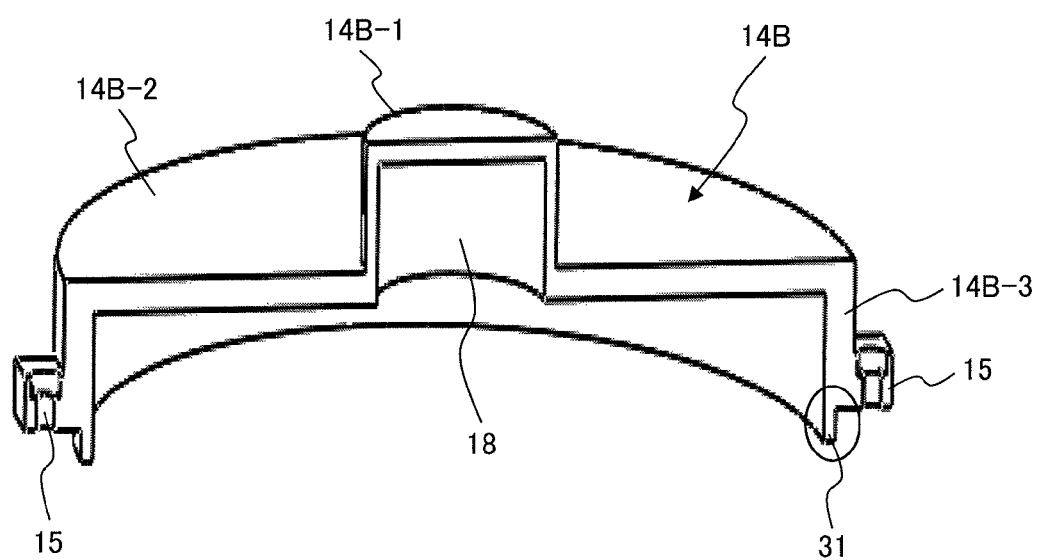
FIG. 8 is an appearance perspective view obtained when the second housing illustrated in FIG. 1 is sectioned.

FIG. 8 illustrates the second housing 14B and the second housing 14B is in a shallow, closed-end, cylindrical shape. In the center portion 14B-1 of the bottom portion 14B-2, the bearing housing portion 18 for housing the bearing 13B is formed. A bracket 15 is formed on the circumference on the tip side of a cylindrical portion 14B-3 and a stepped portion 31 reduced in diameter toward the inner circumference side is formed at the tip. This stepped portion 31 is socket-and-spigot-joined with the first housing 14A described later. As shown in FIG. 1, the stepped portion 31 at the tip functions to arrest the axial movement of the stator 11.

Figure 9:
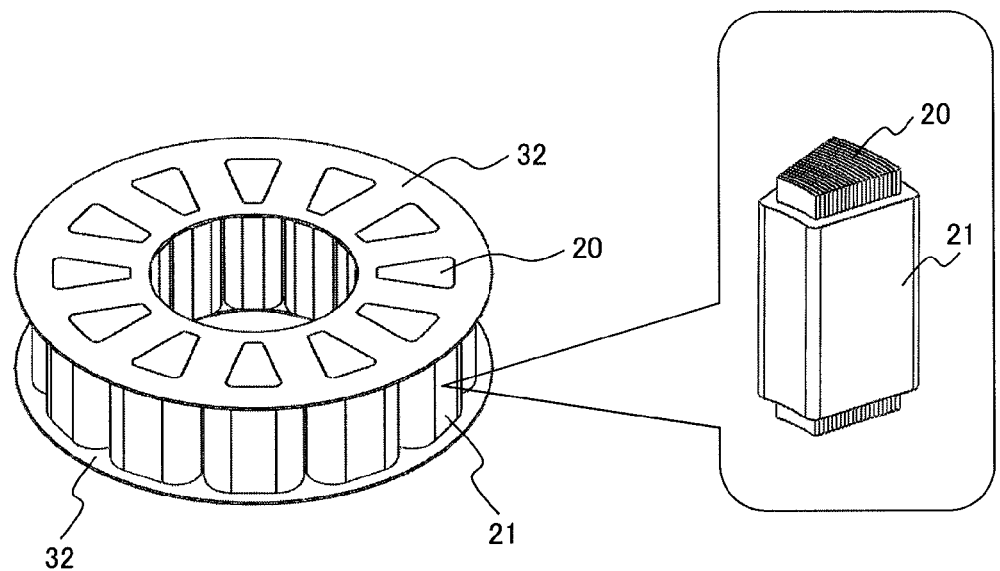
FIG. 9 is an appearance perspective view of the stator illustrated in FIG. 1.

FIG. 9 illustrates the stator 11 and the stator 11 is comprised of a core 20, a coil 21, and a positioning plate 32. These members are integrally configured by an appropriate securing technique. An insulator such as insulating paper or nonmagnetic bobbin is provided between the core 20 and the coil 21. For the core, an electromagnetic steel plate, an amorphous core, a magnetic powder core, and combinations thereof can be used.

The cores 20 and the coils 21 in numbers matched with a number of slots are provided. The cores 20 and the coils 21 in numbers equivalent to the number of slots are annularly placed using the positioning plates 32. The mated cores and coils can be integrated by securing them together by resin molding, welding, or the like.

Figure 10:
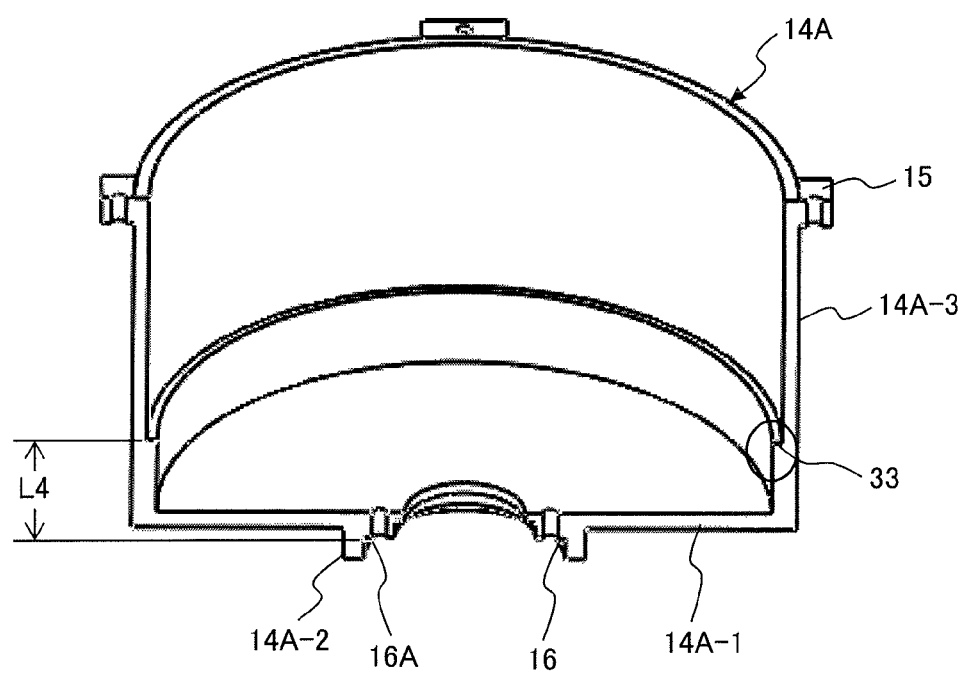
FIG. 10 is an appearance perspective view obtained when the first housing illustrated in FIG. 1 is sectioned.
Figure 11:
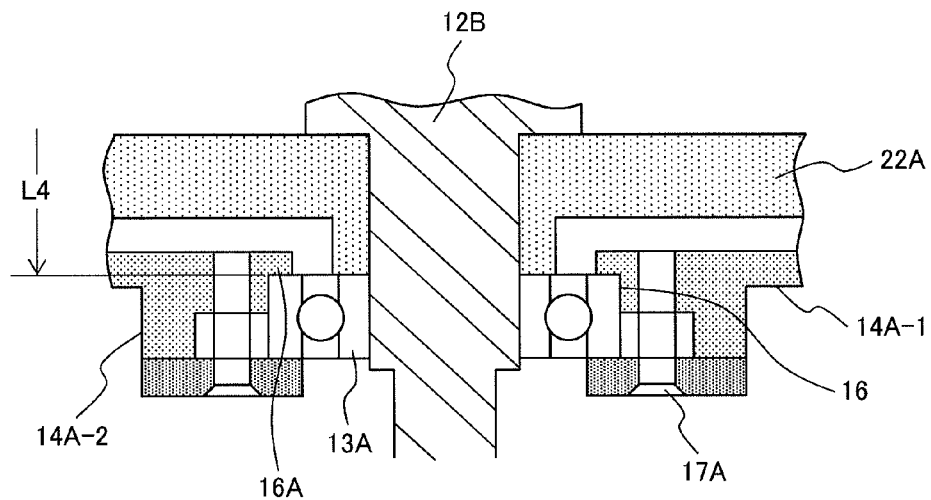
FIG. 11 is an enlarged sectional view obtained when the vicinity of the first housing and rotating shaft illustrated in FIG. 1 is enlarged and sectioned.

FIG. 10 illustrates the first housing 14A and FIG. 11 is an enlarged view of the vicinity of the boss portion 14A-2 of the first housing 14A.

The first housing 14A is in a closed-end cylindrical shape, deeper than the second housing 14B and is provided in proximity to the center of the bottom portion 14A-1 with the boss portion 14A-2 forming the bearing housing portion 16.

A stepped portion 33 for receiving a positioning plate 32 of the stator 11 is formed in position on the inner circumference side of the cylindrical portion 14A-3. The first housing is increased in diameter on the tip side of the stepped portion 33. It receives and houses the end face of the cylindrical portion 14B-3 of the second housing 14B at the end face thereof and they are thereby socket-and-spigot-joined with each other.

The length L4 from the outer ring end face receiving portion 16A on the rotor yoke 10A side of the bearing 13A in the bearing housing portion 16 formed in the boss portion 14A-2 to the stepped portion 33 is also accurately controlled. As a result, the placement position of the stator 11 can be accurately determined by the length L1 of the one-sided boss portion of the rotor yoke 10A and the length L4 from the outer ring end face receiving portion 16A to the stepped portion 33.

Figure 12:
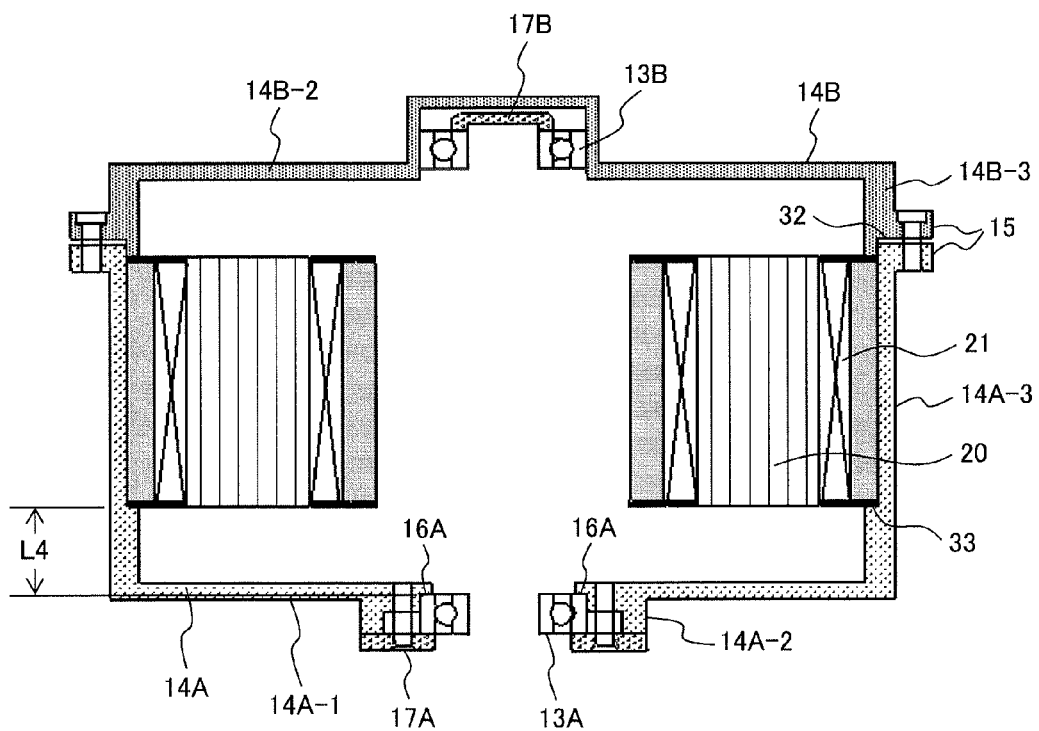
FIG. 12 is a longitudinal sectional view obtained when a first housing and a second housing are mated together and a stator is placed therein, in which rotors that should be placed on both sides of the stator are omitted.

FIG. 12 illustrates the configuration obtained when the first housing 14A, second housing 14, and stator 11 are combined and secured together. When these members are combined, in reality, the rotors 10A, 10B and the rotating shaft 12 illustrated in FIG. 6 are positioned therebetween; however, the depiction thereof is omitted for the sake of explanation.

In FIG. 12, the bearings 13A, 13B are housed and placed in the bearing housing portions 16, 18 in the respective housings 14A, 14B. These bearings are secured using press-fit or bearing retainers 17A, 17B.

The positioning plate 32 placed on one side of the stator 11 is positioned and placed in the stepped portion 33 of the first housing 14A. The positioning plate 32 placed on the other side of the stator 11 is pressed by the tip of the cylindrical portion 14B-3 of the second housing 14B and thereby positioned. The axial position of the stator 11 can be determined by these configuration elements. To stop the circumferential whirl of the stator 11, it can be secured by a knock pin, not shown, or by integrally molding the stator 11 and the cylindrical portion 14A-3 of the first housing 14A with resin.

A description will be given to the reason why the distance of the air gap between each rotor and the stator of an axial gap rotating electrical machine in this embodiment can be accurately controlled with reference to FIG. 1 again.

As mentioned above, the large diameter portion 12A of the rotating shaft 12 is accurately fabricated and the length L2 thereof is as designed. Therefore, the length between the opposite ring magnets 23 of the rotors 10A, 10B is also accordingly accurately determined and the position of each rotor 10A, 10B is consequently accurately determined.

Subsequently, the rotor yoke 22A is secured on a small diameter portion 12B of the rotating shaft 12. The length L1 of the one-sided boss portion 22A-2 of the rotor yoke 22A is also accurately fabricated and the length L1 thereof is as designed. Therefore, the distance from the following stepped portion to the tip of the one-sided boss portion 22A-2 of the rotor yoke 22A becomes equal to the length L1 and is accurately determined: the stepped portion 29 where the large diameter portion 12A of the rotating shaft 12 changes to the small diameter portion 12B.

The tip of the one-sided boss portion 22A-2 of the rotor yoke 22A functions to position the inner ring of the bearing 13A. Therefore, the securing position of the bearing 13A is also accurately determined.

When the position of the bearing 13A is determined, the position of the first housing 14A with the bearing housing portion 16 formed therein is determined. Therefore, the placement position of the stator 11 can be accurately determined by the length L4 from the outer ring end face receiving portion 16A of the bearing housing portion 16 to the stepped portion 33 together with it. As a result, the air gap g between the rotor 10A and the stator 11 can be accurately obtained.

Similarly, the length L2 of the large diameter portion 12A is accurately determined also on the rotor 10B side. Therefore, when the axial length of the stator 11 is accurately determined, the air gap g between the rotor 10B and the stator 11 can be accurately obtained.

The above description has been given from the rotating shaft 12 side to the first housing 14A side. It also applies conversely from the first housing 14A side to the rotating shaft 12 side.

Figure 13:
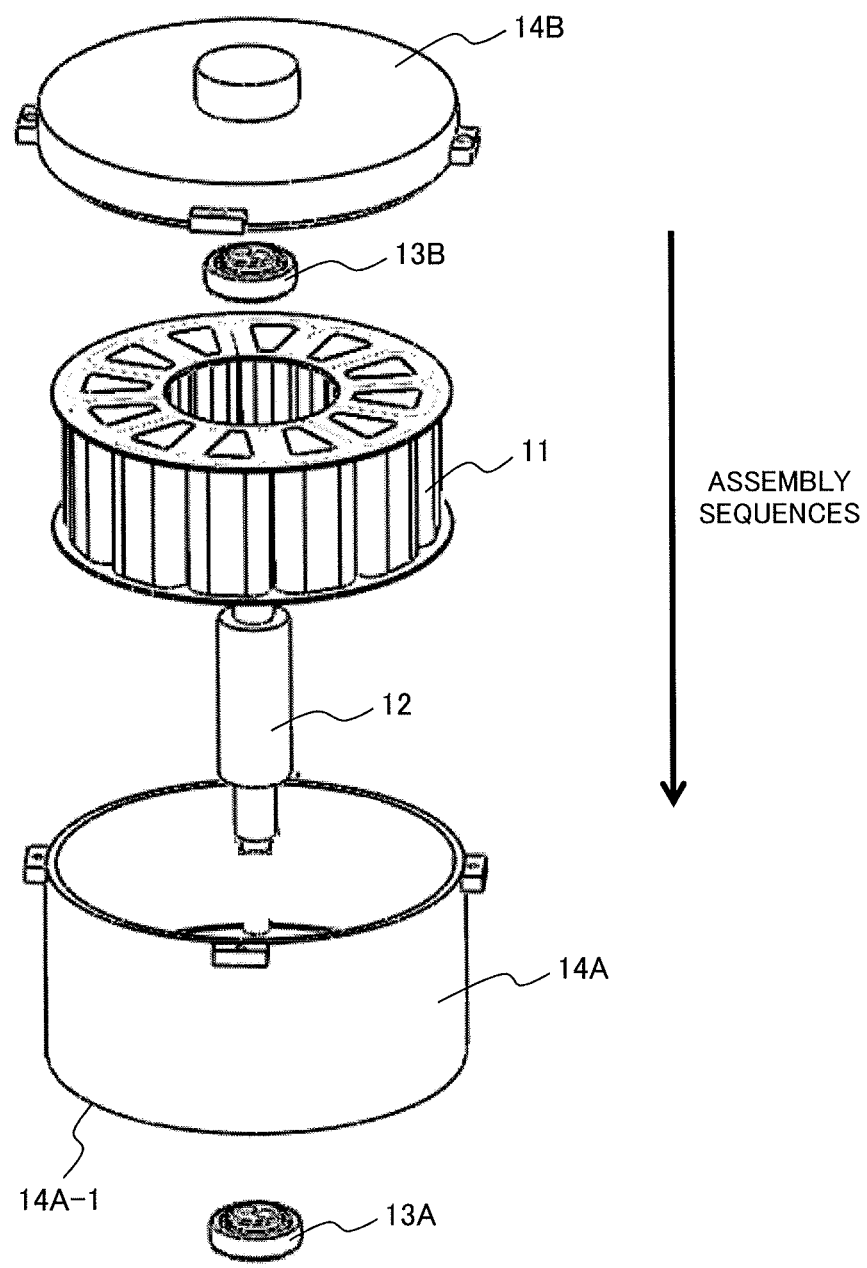
FIG. 13 is an assembly drawing illustrating assembly sequences for an axial gap rotating electrical machine in an embodiment of the invention, in which rotors are omitted.

FIG. 13 illustrates assembly sequences for an axial gap rotating electrical machine in this embodiment. As mentioned above, the rotating electrical machine in this embodiment is assembled by sequentially stacking members from the first housing 14A side. Also in this drawing, the depiction of the rotors 10A, 10B is omitted for the sake of explanation.

First, the bearing 13A is secured in the boss portion 14A-2 formed in the bottom portion 14A-1 of the first housing from outside.

Subsequently, the rotating shaft 12 with the rotor 10A secured on a small diameter portion 12B thereof is placed in the first housing 14A. The small diameter portion 12B of the rotating shaft 12 is inserted into the bearing 13A until the tip of the one-sided boss portion 22A-2 of the rotor yoke 22A hits the inner ring of the bearing 13A.

Subsequently, the stator 11 is placed in the first housing 14A and the stator 11 is inserted until a positioning plate 32 hits the stepped portion 33 of the first housing 14A.

Subsequently, the rotor 10B is inserted onto a small diameter portion 12B of the rotating shaft 12 until it hits a stepped portion 29 of the large diameter portion 12A.

Subsequently, the bearing 13B is attached to the small diameter portion 12B of the rotating shaft 12 and lastly, the second housing 14B is put on the first housing and the respective brackets 15 are secured with bolts. The axial gap rotating electrical machine is thus assembled. With respect to the bearing 13B, the following can be implemented by replacing the bearing retainer 17B with an elastic body such as a spring: the displacement of the rotating shaft 12 in the axial direction can be cancelled and the abnormal noise can be suppressed.

According to the above-mentioned embodiment, accurate air gaps can be obtained and further the following action and effects can be brought about:

(1) The knurled portion is provided in the inner circumferential portion of each rotor yoke and the outer circumferential portion of the rotating shaft. This makes it easier to position the magnetic poles between the individual rotors. As a result, the number of assembling parts can be reduced.

(2) The ring magnet is used for the rotor magnets. This makes the axial gap rotating electrical machine resistant to centrifugal force produced during the rotation thereof.

(3) The depth of the groove portion provided in each rotor yoke is set to ⅓ of the thickness of each magnet or below and the inner circumferential wall portion thereof is swaged. Therefore, the rotor yokes and the ring magnets can be easily assembled.

(4) Each rotor is sandwiched and secured between a bearing and the large diameter portion of the rotating shaft. This makes it possible to reduce problems such as malfunction of a bearing due to magnetic attractive force.

(5) At least one bearing makes it possible to accurately determine the positions of the stator and a rotor secured in a housing. By allowing the other bearing to freely move in the axial direction, any dimensional tolerance of each part can be absorbed. When the position of one bearing is determined, as mentioned above, the positions of other related parts can also be uniquely and accurately determined. In addition, the motor parts can be assembled by stacking and they can be easily dismantled.

(6) Since the first housing and the second housing are secured together with brackets, the axial length of each housing can be adjusted. Therefore, it is possible to absorb any dimension error and assembly error of each part.

Second Embodiment

A description will be given to a second embodiment of the invention with reference to FIG. 14. This embodiment has a configuration close to that of a product but it adopts basically the same configuration as that of the first embodiment.

Figure 14:
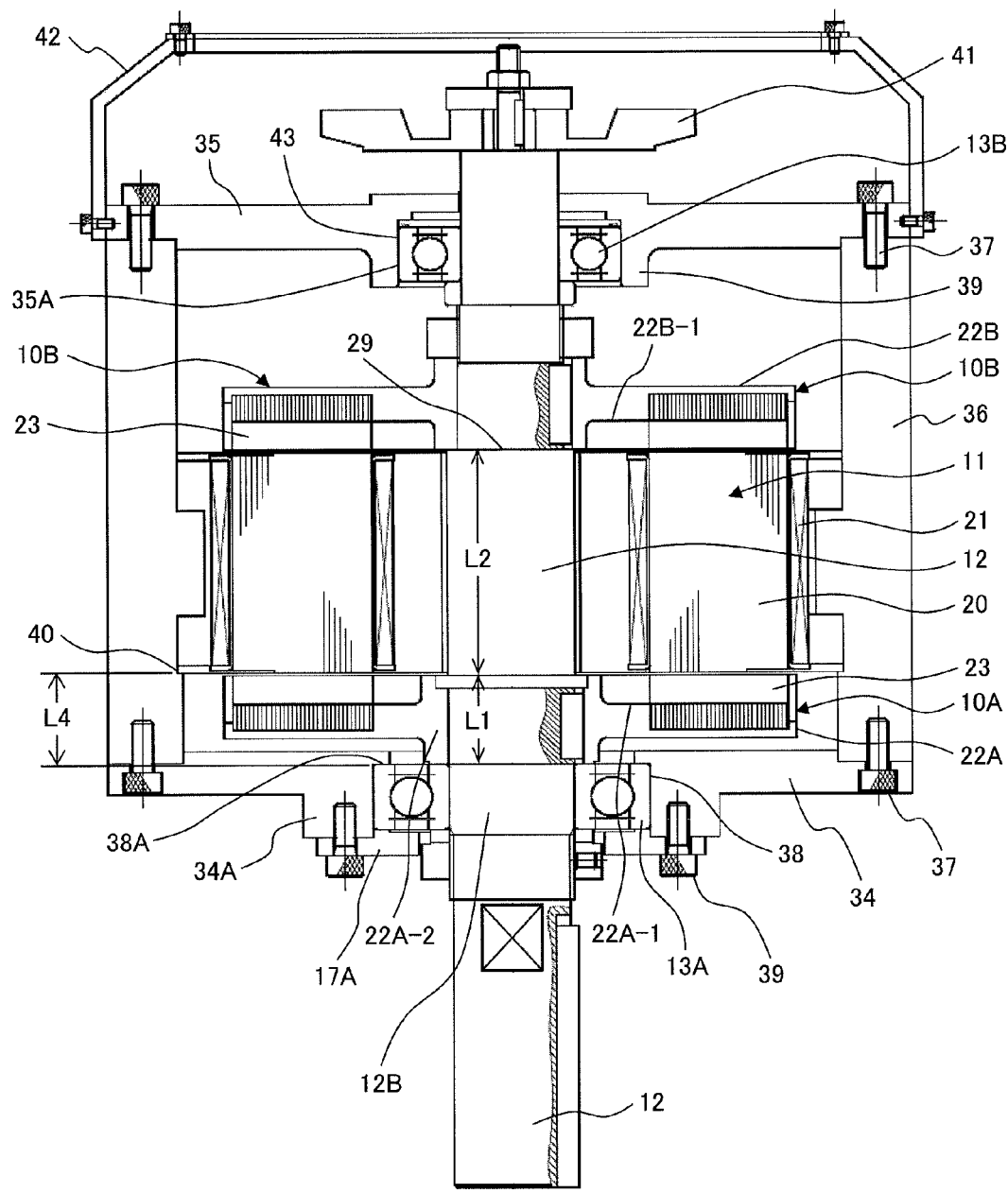
FIG. 14 is a longitudinal sectional view of an axial gap rotating electrical machine in another embodiment of the invention.

The axial gap rotating electrical machine in FIG. 14 is comprised of: two disk-like rotors 10A, 10B; a stator 11 placed between the rotors 10A, 10B and opposed thereto with a predetermined air gap in-between; a rotating shaft 12 securing each rotor 10A, 10B and rotatably supporting them; a first cover 34 and a second cover 35 rotatably holding both ends of the rotating shaft 12 by bearings 13A, 13B; a housing 36 with double open ends, housing the stator 11 and the rotors 10A, 10B in cooperation with the first cover 34 and the second cover 35; and the like.

The housing 36 is in a cylindrical shape and the stator 11 is secured therein. The first cover 34 and the second cover 35 close the openings of the housing 36 and they are secured together with bolts 37.

Therefore, the rotating shaft 12 is rotatably supported by the bearing 13A provided in the boss portion 34A of the first cover 34 and the bearing 13B provided in the boss portion 35A in proximity to the center portion of the second cover 35.

The inner ring of the bearing 13A provided in the first cover 34 is secured on a small diameter portion 12B of the rotating shaft 12; and the outer ring thereof is secured in the bearing housing portion 38 formed in the boss portion 34A of the first cover 34. The outer ring is integrated with the first cover 34 by a bearing retainer 17A provided in the boss portion 34A of the first cover 34. The bearing retainer 17A is secured in the boss portion 34A with a bolt 39.

The inner ring of the bearing 13B provided in the boss portion 35A in proximity to the center portion of the second cover 35 is secured on a small diameter portion 12B of the rotating shaft 12; and the outer ring thereof is secured in the bearing housing portion 43 formed in the boss portion 35A of the second cover 35.

The stator 11 has the outer circumference thereof secured on the inner circumferential wall of the housing 36 by synthetic resin having adhesive properties. The inner circumference of the stator 11 is opposed to the rotating shaft 12 with a predetermined gap in-between.

The stator 11 is comprised of a core 20 and a winding 21 and the winding 21 is wound around the core 20 with an insulating material in-between.

The rotors 10A, 10B are each comprised of a rotor yoke 22A, 22B and a flat ring magnet 23 circumferentially placed on the surface of each of the rotor yokes 22A, 22B. Each ring magnet 23 is placed in opposition to a core 20 with a predetermined air gap g in-between.

In the axial gap rotating electrical machine, as seen from the drawing, the rotors 10A, 10B and the stator 11 are placed in parallel in the direction of the axis of the rotating shaft 12. In the drawing, the rotor 10A, air gap g, stator 11, air gap g, and rotor 10B are placed from bottom in this order along the direction of the axis.

As in the first embodiment, the rotor yoke 22A includes a flat portion 22A-1 holding the ring magnet 23 and a double-sided boss portion 22A-2 forming the securing hole 27. In this embodiment, the length L1 from the surface of the flat portion 22A-1 to the tip of the double-sided boss portion 22-A is accurately controlled. The length L1 serves an important function for accurately assembling the air gap g between the rotor 10A (and 10B) and the stator 11, which will be described later.

A large diameter portion 12A is formed in the vicinity of the center of the rotating shaft 12 and a small diameter portion 12B is formed on both sides of the large diameter portion 12A. The large diameter portion 12A is opposed to the inner circumferential portion of the stator 11 and the small diameter portions 12B are portions where the rotor yokes 22A, 22B are secured.

The length L2 of the large diameter portion 12A between the small diameter portions 12B also serves an important function for accurately assembling the air gap g between the rotors 10 and the stator 11. That is, the length L2 of the large diameter portion 12A of the rotating shaft 12 is accurately controlled; as a result, the length between the flat portions 22A-1, 22B-1 of the respective rotor yokes 22A, 22B of the two rotors 10A, 10B is also accurately controlled.

As mentioned above, the length L2 of the large diameter portion 12A and the length L1 of the double-sided boss portion 22A-2 of the rotor yoke 22A are accurately controlled. As a result, the length to the tip of the double-sided boss portion 22A-2 of the rotor yoke 22A is also accurately controlled.

The rotors 10A, 10B and the stator 11 pull each other hard by the magnetic attractive force produced therebetween. However, since the rotor yokes 22A, 22B are secured on the small diameter portion 12B, the following takes place: the movement of the rotor yokes 22A, 22B is arrested by the stepped portions 29 formed between the small diameter portions 12B and the large diameter portion 12A. This makes it possible to prevent the axial displacement of the rotors 10A, 10B and accurately control the air gaps g.

A stepped portion 40 for receiving a positioning plate 32 of the stator 11 is formed in position on the inner circumference side of the housing 36. The housing is increased in diameter on the tip side of the stepped portion 40 and is secured together with the second cover 35 at the end face thereof with the bolts 37.

The length L4 from the following to the stepped portion 40 is also accurately controlled: the outer ring end face receiving portion 38A on the rotor yoke 10A side of the bearing 13A of the bearing housing portion 38 formed in the boss portion 34A of the first cover 34. As a result, the placement position of the stator 11 can be accurately determined by the following: the length L1 of the double-sided boss portion of the rotor yoke 10A and the length L4 from the outer ring end face receiving portion 38A to the stepped portion 40.

The positioning plate 32 placed on one side of the stator 11 is positioned and placed in the stepped portion 40 of the housing 36. To stop the circumferential whirl of the stator 11, it can be secured by a knock pin, not shown, or by integrally molding the stator 11 and the inner circumferential portion of the housing 36 with resin.

A cooling fan 41 is secured on the rotating shaft 12 outside the second cover 35 and heat produced in the coil 21 is let out.

The cooling fan 41 is covered with a mesh or a protective cover 42 in a similar shape for the sake of safety.

A description will be given to the reason why the distance of the air gap between each rotor and the stator of an axial gap rotating electrical machine in this embodiment can be accurately controlled.

As mentioned above, the large diameter portion 12A of the rotating shaft 12 is accurately fabricated and the length L2 thereof is as designed. Therefore, the length between the opposite ring magnets 23 of the rotors 10A, 10B is also accordingly accurately determined and the position of each rotor 10A, 10B is consequently accurately determined.

Subsequently, the rotor yoke 22A is secured on a small diameter portion 12B of the rotating shaft 12. The length L1 of the double-sided boss portion 22A-2 of the rotor yoke 22A is also accurately fabricated and the length L1 thereof is as designed. Therefore, the distance from the following stepped portion to the tip of the double-sided boss portion 22A-2 of the rotor yoke 22A becomes equal to the length L1 and is accurately determined: the stepped portion where the large diameter portion 12A of the rotating shaft 12 changes to the small diameter portion 12B.

The tip of the double-sided boss portion 22A-2 of the rotor yoke 22A functions to position the bearing 13A. Therefore, the securing position of the bearing 13A is also accurately determined.

When the position of the bearing 13A is determined, the position of the first cover 34 with the bearing housing portion 38 formed therein is determined. Therefore, the placement position of the stator 11 can be accurately determined by the length L4 from the outer ring end face receiving portion 38A of the bearing housing portion 38 to the stepped portion 40 together with it. As a result, the air gap g between the rotor 10A and the stator 11 can be accurately obtained.

Similarly, the length L2 of the large diameter portion 12A is accurately determined also on the rotor 10B side. Therefore, when the axial length of the stator 11 is accurately determined, the air gap g between the rotor 10B and the stator 11 can be accurately obtained.

As mentioned above, axial gap rotating electrical machines are so structured that components are stacked along the direction of the axis of a rotating shaft. Therefore, the dimension errors of each component are accumulated and it used to be difficult to ensure an accurate air gap. According to the invention, the distance of the air gap between a rotor and a stator can be accurately controlled.

In the above description, cases where the invention is applied to two-rotor/one-stator axial gap rotating electrical machines have been taken as examples. Aside therefrom, the invention is also applicable to one-rotor/one-stator axial gap rotating electrical machines, one-rotor/two-stator axial gap rotating electrical machines, and the like.

What is claimed is:

1. An axial gap rotating electrical machine comprising:
   a rotating shaft having a stepped portion between a large diameter portion and a small diameter portion;
   a rotor comprised of a rotor yoke secured on the small diameter portion of the rotating shaft in tight contact with the stepped portion and a permanent magnet secured on the inside surface of the rotor yoke;
   a first housing holding a first bearing positioned by a securing portion which is provided on the rotor yoke and secures the rotor yoke on the small diameter portion of the rotating shaft and rotatably supporting the rotating shaft;
   a stator positioned and secured by a stepped portion formed in the inner circumferential wall of the first housing so that the stator is opposed to the permanent magnet with a predetermined air gap in-between on the inner circumference of the first housing; and
   a second housing coupled with the housing and having therein a second bearing which rotatably supports the rotating shaft;
   wherein the securing portion provided in the rotor yoke is a one-sided boss portion or a double-sided boss portion; and
   wherein the boss portion provided in the rotor yoke positions the inner ring of the first bearing, and the outer ring of the first bearing is secured in the first housing.

2. An axial gap rotating electrical machine comprising:
   a rotating shaft having a stepped portion between a large diameter portion and a small diameter portion;
   a rotor comprised of a rotor yoke secured on the small diameter portion of the rotating shaft in tight contact with the stepped portion and a permanent magnet secured on the inside surface of the rotor yoke;
   a first cover positioned by a securing portion which is provided in the rotor yoke and secures the rotor yoke on the small diameter portion of the rotating shaft and holding a first bearing which rotatably supports the rotating shaft;
   a cylindrical housing coupled with the first cover and housing the rotor therein;
   a stator positioned and secured by a stepped portion formed in an inner circumferential wall of the housing so that the stator is opposed to the permanent magnet with a predetermined air gap in-between on the inner circumference of the housing; and
   a second cover coupled with the housing and having therein a second bearing which rotatably supports the rotating shaft;
   wherein the securing portion provided in the rotor yoke is a one-sided boss portion or a double-sided boss portion; and
   wherein the boss portion provided in the rotor yoke positions the inner ring of the first bearing, and the outer ring of the first bearing is secured in the first housing.

3. The axial gap rotating electrical machine according to claim 1,
   wherein a small diameter portion is formed on both sides of the large diameter portion of the rotating shaft with a stepped portion in-between,
   and a pair of rotors are respectively secured on the small diameter portions.

4. The axial gap rotating electrical machine according to claim 1,
   wherein the outer ring of the first bearing is secured in the first housing through a bearing retainer.

5. The axial gap rotating electrical machine according to claim 1,
   wherein the inner circumferential portion of the rotor yoke and the outer circumferential portion of the small diameter portion of the rotating shaft are secured together by knurling.

6. The axial gap rotating electrical machine according to claim 1,
   wherein the permanent magnet is a ring magnet.

7. The axial gap rotating electrical machine according to claim 6,
   wherein the rotor yoke has an outer circumferential wall portion and an inner circumferential wall portion,
   the ring magnet is placed in an annular groove portion therebetween,
   and the depth of the groove being made equal to ⅓ of the thickness of the ring magnet or below.

8. The axial gap rotating electrical machine according to claim 6,
   wherein the rotor yoke has an outer circumferential wall portion and an inner circumferential wall portion,
   the ring magnet is placed in an annular groove portion therebetween,
   and part of the inner circumferential wall portion being brought to the inner circumference side of the ring magnet to secure the rotor yoke and the ring magnet.

9. The axial gap rotating electrical machine according to claim 1,
   wherein the boss portion of the rotor yoke is sandwiched and secured between the first bearing and the stepped portion of the rotating shaft.

10. The axial gap rotating electrical machine according to claim 1,
    wherein the first housing and the second housing are coupled together by joining brackets formed on the outer circumference thereof.

11. The axial gap rotating electrical machine according to claim 2,
    wherein the securing portion provided in the rotor yoke is a one-sided boss portion or a double-sided boss portion.

12. The axial gap rotating electrical machine according to claim 11,
    wherein the boss portion provided in the rotor yoke positions the inner ring of the first bearing and the outer ring of the first bearing is secured in the first cover.

13. The axial gap rotating electrical machine according to claim 12,
    wherein the outer ring of the first bearing is secured in the first cover through a bearing retainer.

* * * * *